A. MOORHOUSE.
VEHICLE TOP.
APPLICATION FILED JAN. 8, 1914.
1,133,654.
Patented Mar. 30, 1915.
2 SHEETS—SHEET 1.
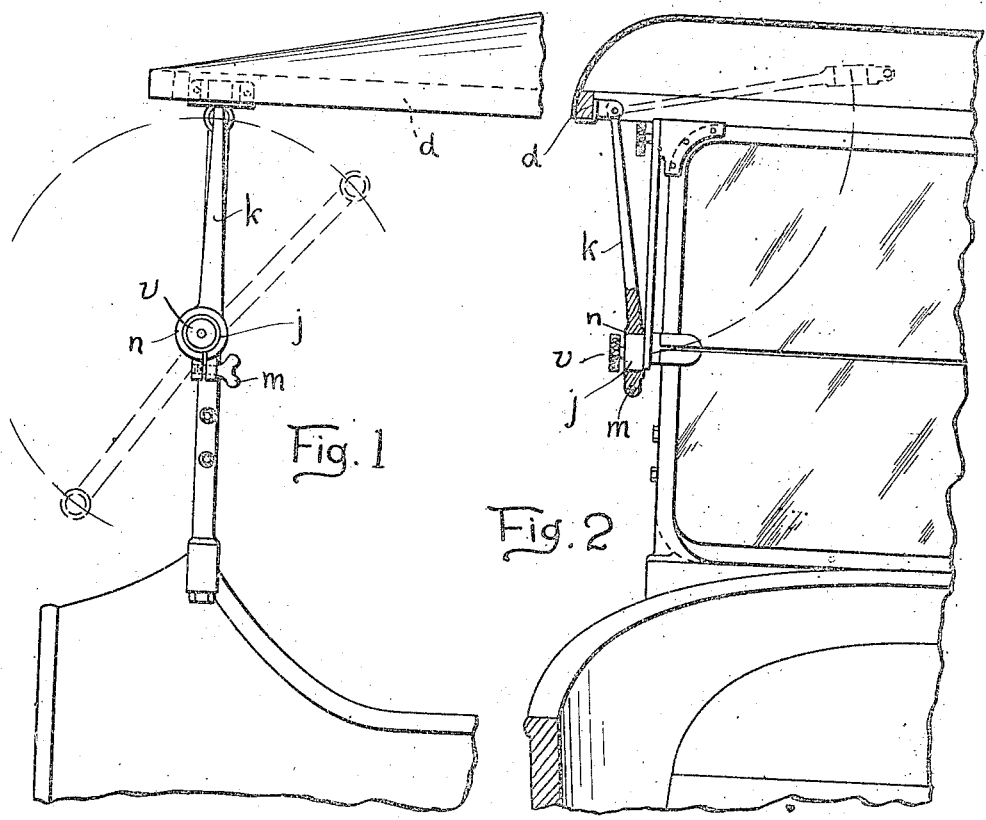
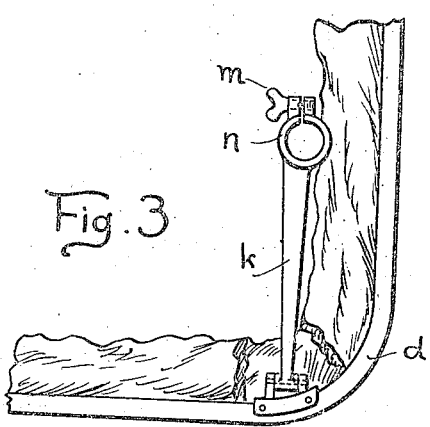
WITNESSES
Marietta E. Rudd
Virginia C. Spratt
INVENTOR
Alfred Moorhouse
BY
Raymond A. Parker
ATTORNEY

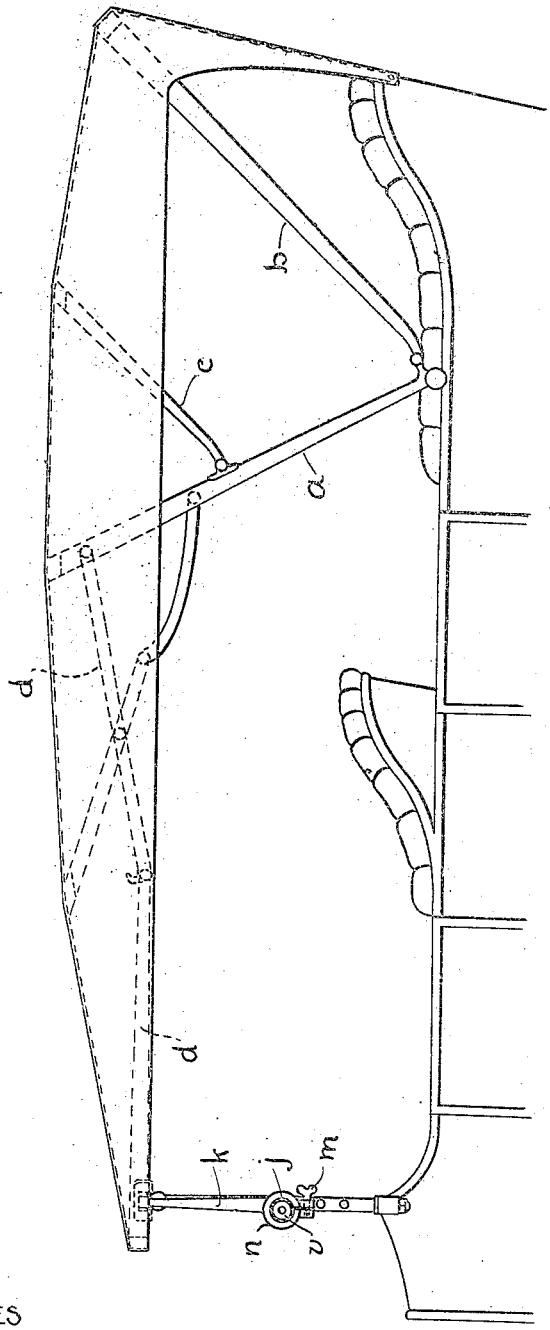

UNITED STATES PATENT OFFICE.

ALFRED MOORHOUSE, OF DETROIT, MICHIGAN, ASSIGNOR TO HUDSON MOTOR CAR COMPANY, OF DETROIT, MICHIGAN, A CORPORATION OF MICHIGAN.

VEHICLE-TOP.

1,133,654.

Specification of Letters Patent.

Patented Mar. 30, 1915.

Application filed January 8, 1914. Serial No. 810,946.

*To all whom it may concern:*

Be it known that I, ALFRED MOORHOUSE, a citizen of the United States, residing at Detroit, county of Wayne, State of Michigan, have invented a certain new and useful Improvement in Vehicle-Tops, and declare the following to be a full, clear, and exact description of the same, such as will enable others skilled in the art to which it pertains to make and use the same, reference being had to the accompanying drawings, which form a part of this specification.

This invention relates to vehicle tops and has for its object a device for supporting and steadying the same.

It is especially designed for use in connection with the type of vehicle top which bears the familiar name of "the one man top." However, it may serve a useful purpose with any top in common use.

In the drawings:—Figure 1, is a fragmentary side view of the forward part of an automatic body, top and the wind-shield. Fig. 2, is a fragmentary elevational view of the wind-shield, the inside of the top and the inside of the body of an automobile. This is taken from the driver's seat, looking toward the wind-shield. Fig. 3, is a fragmentary plan view of the top collapsed, showing the disposition of one of the brace rods. Fig. 4, is a side view of an automobile body and top, showing the "one man" form and my invention applied thereto.

The "one man" form of top for automobiles is fast coming into popular favor by reason of the fact that it may be collapsed or raised by the driver unaided, whereas the old form of top requires assistance for one attempting to raise or collapse it. The "one man" form of top is built on the cantaliver principle. I have shown here in Fig. 4, one of the forms of "one man" top. It consists of a major bow $a$ to which is pivoted one long bow $b$ and one short bow $c$. Each of these bows is provided with suitable bow sockets. The forward long bow $a$ carries a jointed cantaliver in the form of lazy-tongs which terminates in the forward shaping-bow $d$. This form of "one man" top construction is only one of many that might be used and I am merely describing it to show the utility of my invention in connection with a "one man" top.

It will be observed that the forward end of the cantaliver construction is supported for considerable distance. Although straps have been used to help fix this overhanging portion of the top in position still its unsteadiness and lack of strength has been and still is a recognized defect It is the purpose of my invention to do away with this unsteadiness and yet at the same time not to interfere with the facile operation of this style of top, or with the swinging of the wind-shield. This I accomplish by providing a bearing $j$, preferably cylindrical, extending outwardly from the wind-shield joint. A brace arm $k$ is pivoted to the bow $d$ near the point of curvature where it turns to form the front of the top. This pivoting is such that the brace arm may swing transversely of the top (see Fig. 2). The lower end of the brace arm terminates in a split ring $n$ the portions of which can be tightened or loosened by the winged screw $m$. Hence the split ring may be slipped directly over the bearing $j$ and the winged screw $m$ tightened and the brace rod will be in position for service. There is a brace rod on each side and this operation is so simple that the brace rods may be quickly placed for service or may be quickly detached. When they are detached they hang loosely until the forward cantaliver structure of the top has been gathered together, the bows at the rear folded together, and the front bow $d$ turned backward over the rest of the top whereupon they will occupy the position shown in Fig. 3. It cannot move sidewise when lying upon the collapsed top and its weight serves to keep it from moving up and down. When the cover is placed over the collapsed top the brace rods are not only concealed but are safely stowed away.

In Fig. 1, I have illustrated the wind-shield in dotted lines in a second position. It will be seen that by securing the brace rods $k$ on bearings extending from the wind-shield that they in no wise interfere with the operation of the wind-shield.

$v$ is the usual tightening screw by which the adjustable portion of the wind-shield is secured in its various positions. This screw is axially in line with the bearing $j$, and the bearing is of such a size that the ring $n$ will pass over the screw $v$ without interfering with it.

What I claim is:

1. The combination of a vehicle body provided with a wind-shield, a top supported by the body, a bearing extended from the joint of the wind-shield and a rigid brace rod pivotally secured to the forward end of the top and detachably secured to the extended bearing, substantially as described.

2. The combination of a vehicle body provided with a wind-shield, a top supported by the body, an extended bearing at the wind-shield joint, a rigid brace rod pivoted to the top at the forward end so as to swing only in a plane transverse the top and detachably securable to the extended bearing, substantially as described.

3. The combination of a vehicle body provided with a wind-shield, a top supported by the body, an extended bearing at the wind-shield joint, and a brace rod swingingly supported by the top at the forward end and having a split ring terminal provided with a screw whereby the brace rod may be secured to the extended bearing, substantially as described.

In testimony whereof, I sign this specification in the presence of two witnesses.

ALFRED MOORHOUSE.

Witnesses:
  AGNES M. HIPKINS,
  ELLIOTT J. STODDARD.